US006298833B1

(12) United States Patent
Douville et al.

(10) Patent No.: US 6,298,833 B1
(45) Date of Patent: Oct. 9, 2001

(54) FLUID SEAL APPARATUS AND METHOD FOR DYNAMICALLY CONTROLLING SEALING-FLUID PRESSURE

(75) Inventors: Brad Douville, Vancouver; Stephen D. Noble, West Vancouver; S. Michael Baker, Delta; Minh Tran; Alain Touchette, both of Vancouver, all of (CA)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 09/545,391

(22) Filed: Apr. 7, 2000

(51) Int. Cl.$^7$ ....................................................... F02B 43/00
(52) U.S. Cl. ...................... 123/527; 123/526; 123/27 GE
(58) Field of Search ............................... 123/27 GE, 526, 123/527

(56) References Cited

U.S. PATENT DOCUMENTS

| 4,093,239 | 6/1978 | Sugahara . |
| 4,233,886 | 11/1980 | Balzano et al. . |
| 4,704,997 | 11/1987 | Endo et al. . |
| 5,024,195 | 6/1991 | Pien . |
| 5,163,397 | 11/1992 | Pien . |
| 5,474,303 | 12/1995 | Coles . |
| 5,711,270 | 1/1998 | Pedersen . |
| 5,771,857 | 6/1998 | Willi . |
| 5,772,216 | * | 6/1998 | Bredemeyer ..................... 277/318 |
| 5,890,459 | * | 4/1999 | Hedrick et al. ..................... 123/527 |
| 5,996,558 | * | 12/1999 | Oullette et al. ................. 123/27 GE |
| 6,073,862 | * | 6/2000 | Touchette et al. ................. 239/408 |
| 6,202,601 | * | 3/2001 | Ouellette et al. ..................... 123/526 |

FOREIGN PATENT DOCUMENTS

WO 95/24551 9/1995 (WO) .
WO 98/57751 12/1998 (WO) .

* cited by examiner

Primary Examiner—Willis R. Wolfe
Assistant Examiner—Jason Benton
(74) Attorney, Agent, or Firm—McAndrews, Held & Malloy, Ltd.

(57) ABSTRACT

A dynamic fluid sealing system for a fuel injection valve employs sealing-fluid to separate a gaseous fuel and a second fluid in the fuel injection valve, thereby preventing leakage of the gaseous fuel into the second fluid. A pressure-balancing system, which includes a pressure-balancing device, reduces the pressure differential between the sealing-fluid and the gaseous fuel used in the injection valve. At the same time, the pressure balancing system dynamically balances the sealing-fluid pressure such that the sealing-fluid pressure is equal to or slightly greater than the pressure of the gaseous fuel within the injection valve. The pressure differential between the gaseous fuel and the sealing-fluid may be maintained throughout the operating range of engine speeds, engine loads, and fuel cut-off conditions so as to prevent leakage of compressible gaseous fuel into the second fluid. The reduced pressure differential between the gaseous fuel and the sealing-fluid also reduces leakage of sealing-fluid into the gaseous fuel.

48 Claims, 7 Drawing Sheets

FLUID SEAL APPARATUS AND METHOD FOR DYNAMICALLY CONTROLLING SEALING-FLUID PRESSURE

FIELD OF THE INVENTION

The present invention relates generally to a fluid seal apparatus and method for dynamic sealing-fluid pressure control for a mechanical device with a fluid-sealable chamber. More particularly, the invention relates to an apparatus and method that seals against fuel leakage within a fuel injection valve for an internal combustion engine.

BACKGROUND OF THE INVENTION

Gaseous fuels, such as natural gas, are promising candidates for fueling diesel engines because of their ready availability and potential for reducing particulate emissions. When gaseous fuel is injected directly into an engine's combustion chamber at the end of the compression stroke, in a so-called "direct injection" engine, a further benefit is that the high efficiency characteristics of diesel engines is maintained. To overcome the cylinder pressure near the end of the compression stroke (near top dead center), a higher gas injection pressure is required for the gaseous fuel to enter the combustion chamber. When the injection valve assembly employs a second fluid, leakage of the gaseous fuel into the compartments of the injection valve containing the second fluid can adversely affect the operation of the injection valve. For example, if the gaseous fuel injection valve is hydraulically actuated, leakage of the gaseous fuel into the actuating fluid could contaminate the hydraulic actuation circuit so as to prevent or inhibit actuation. Known, conventional hydraulically actuated liquid fuel injection valves have traditionally relied on extremely low diametric clearances between the bore and the reciprocating valve needle disposed within the bore to reduce leakage of pressurized liquid fuel into the hydraulic actuation fluid and vice versa. This method, however, does not provide a positive seal between the liquid fuel and hydraulic actuation fluid and therefore does not substantially eliminate leakage but simply reduces it. A gaseous fuel has extremely low viscosity and thus low diametric clearances are ineffective for sealing low viscosity fluids. Accordingly, low diametric clearances are, in general, insufficiently reliable for providing effective sealing for hydraulically actuated gaseous fuel injection valves.

Known, conventional sealing strategies for gaseous fuel injection valves have traditionally involved )-rings or other soft or polymeric material seals, which act to prevent leakage of pressurized fuel into the other injection valve compartments. However, a drawback of using traditional elastomeric O-rings in high-pressure direct injection systems is the general inability of conventional O-ring materials to withstand rapid reciprocation rates and the high-pressure conditions found within a fuel injection valve without a severe reduction in operative lifespan. In response to the foregoing limitations, sealing techniques employed in gaseous fuel injection valves have evolved so as to incorporate fluid seals.

Fluid seals in gaseous fuel injection valves typically employ a pressurized sealing-fluid that prevents leakage of gaseous fuel into other compartments within the injection valve and/or into a second fluid, such as hydraulic fluid or a secondary fuel. Provided that the pressure of the sealing-fluid is greater than that of the gaseous fuel, the gaseous fuel will not leak past the sealing-fluid and into the second fluid. Preferably, the sealing-fluid is also combustible, such that a small amount of leakage of sealing-fluid into the fuel is acceptable.

A fluid seal is described in U.S. Pat. No. 5,163,397 (the '397 patent), issued Nov. 17, 1992. The '397 patent describes a pilot fuel injection pump that comprises plunger that reciprocates in a bore. A sealing-fluid is pressurized in an annular groove provided in the surface of the plunger to form a fluid seal. The purpose of the seal is to prevent leakage of the pilot fuel past the fluid seal.

A further example, U.S. Pat. No. 5,890,459 (the '459 patent), issued Apr. 6, 1999, discloses an injection system for a dual fuel direct injection combustion engine. The disclosed system comprises three separate injection valves for introducing fuel into a combustion chamber. A liquid seal employs a pump that pressurizes a sealing-fluid to a constant pressure that is higher than that of the combustible gaseous mixture.

For systems designed to handle gaseous fuels, it is important that the sealing-fluid be maintained at a pressure level higher than the gaseous fuel pressure; otherwise the gaseous fuel may breach the fluid seal and leak out, resulting in inefficiencies caused by lost fuel and possibly operational difficulties, if for example, the gaseous fuel leaks into a hydraulic fluid. Fluid seal systems, such as those disclosed in the '397 patent and the '459 patent, typically maintain the sealing-fluid pressure at a constant level which is higher than the highest anticipated gaseous fuel pressure.

U.S. Pat. No. 5,996,558 (the '558 patent), issued Dec. 7, 1999, which is co-owned along with the present application by Westport Research Inc., discloses a hydraulically actuated gaseous fuel injection system in which the gaseous fuel pressure may vary as a function of engine speed and other engine load conditions in order to improve combustion. U.S. Pat. No. 5,771,857 (the '857 Patent), issued Jun. 30, 1998, also discloses a variable fuel gas pressure control system for a direct injected internal combustion engine where the fuel gas pressure varies according to engine load. Accordingly, it is desirable to provide a fluid seal that is dynamically maintained at a pressure greater than the changing pressure of the gaseous fuel. Maintaining the sealing-fluid pressure at a constant level that is higher than the anticipated maximum gaseous fuel pressure, results in an excessive amount of sealing-fluid leaking into the gaseous fuel when the gaseous fuel pressure is much lower than the predetermined maximum gaseous fuel pressure, since, during these times, the pressure differential between the sealing-fluid and the gaseous fuel is excessively high. When the sealing-fluid pressure is higher than the gaseous fuel pressure, some of the sealing-fluid flows in a laminar or restricted fashion through the diametric clearance gap between the bore and the reciprocating valve needle disposed within the bore. The restricted flow of sealing-fluid can be described by the following equation:

$$Q_{SD} = (kc^3 \Delta P) \div L,$$

where $Q_{SD}$ is the flow of the sealing-fluid, k is a constant, c is the diametric clearance between the valve and the valve chamber, $\Delta P$ is the pressure difference between the sealing-fluid in the annular groove and the gas in the gas chamber, and L is the length of the bore between the annular groove and the valve fuel chamber within the injection valve. Machining capabilities limit reductions in diametric clearance c and space constraints typically limit increases in length L. However, by reducing $\Delta P$, leakage of sealing-fluid into the valve fuel chamber may be reduced. Accordingly, as $\Delta P$ increases, the flow of sealing-fluid into the valve fuel chamber increases, resulting in the undesirable consumption and combustion of excessive amounts of sealing-fluid. Inefficient and potentially damaging combustion of sealing-fluid is exacerbated in fuel cut-off conditions, where the supply of gaseous fuel to the combustion chamber is arrested. An example of a fuel cut-off condition is when the vehicle is going down a steep hill and engine compression is being used to slow the vehicle. In such a situation, the engine speed is adequate without additional combustion. During fuel cut-off conditions, a significant amount of sealing-fluid may accumulate in the gaseous fuel chamber within the injection valve, and when fuel injection recommences, the accumulated sealing-fluid will be injected into the engine combustion chamber and combusted in the first engine cycle with undesirable environmental and potential equipment-damaging side effects. Leakage of the sealing-fluid in the above-described manner may also result in over-fueling. If the level of fuel in the combustion chamber becomes too excessive, when combustion recommences after a fuel cut-off condition, engine components such as the pistons, the cylinder head, connecting rods and the crankshaft may be over-stressed.

The present sealing apparatus and method overcome the problems set forth above by reducing the pressure differential between the sealing-fluid and the gaseous fuel and by linking the pressure of the sealing-fluid and the gaseous fuel so that the pressure of one fluid is used to dynamically control the pressure of the other fluid. That is, the pressure of the sealing-fluid can change dynamically in response to the changes in the pressure of the gaseous fuel. The present apparatus and method thus provide an improved system over conventional systems that employ a constant pressure sealing-fluid.

It is further desirable to have a sealing system that overcomes the traditional problems of durability under extreme reciprocation rates and pressure conditions that have limited the use of O-ring type seals in fuel injection valves.

It is further desirable to have a fluid sealing system that overcomes the efficiency, environmental and engine component integrity problems associated with excessive leakage of sealing-fluid into the fuel during "fuel cut-off" conditions.

SUMMARY OF THE INVENTION

A fluid seal apparatus provides dynamic pressure control of a sealing-fluid within a fluid seal in a mechanical device. The mechanical device comprises a fuel chamber that is fluidly connected to a fuel supply system. The fuel pressure within the fuel chamber may fluctuate during engine operation, and in a preferred embodiment, fuel pressure within the fuel chamber may be controlled to change in response to changes in engine load conditions. The mechanical device has a moveable component extending through an opening in a wall of the fuel chamber. The fuel seal apparatus comprises:

(a) a fluid seal comprising a cavity formed within said mechanical device, said cavity in fluid communication with a gap formed between said wall and said moveable component, thereby preventing fuel within said fuel chamber from leaking through said gap, wherein said fluid seal is in fluid communication with a sealing-fluid supply system; and (b) a pressure-balancing device comprising:
a first chamber in fluid communication with the sealing-fluid within the sealing-fluid supply system;
a second chamber substantially fluidly isolated from the first chamber and in fluid communication with the fuel within the fuel supply system; and
a control member that is moveable in response to changes in the pressure within at least one of the first and second chambers, wherein the sealing-fluid pressure within the fluid seal is dynamically controllable in coordination with movements of the control member.

The pressure-balancing device is operable to reduce the differential fluid pressure between the sealing-fluid pressure within the fluid seal and the fuel pressure within the fuel chamber. For example, in some embodiments the control member is moveable to adjust the sealing-fluid pressure within the fluid seal in response to changes in the fuel pressure within the second chamber. Whereas conventional fluid seals typically maintain the sealing-fluid pressure within the fluid seal at a fixed pressure, resulting in a fluctuating pressure differential that changes with changes in the fuel pressure within the fuel chamber, the present fluid seal apparatus dynamically controls the fluid pressures to target a pressure differential, which on average, is less than the variable pressure differential of conventional systems. In alternative embodiments, the control member is moveable to adjust the fuel pressure within the fuel chamber in response to changes in sealing-fluid pressure within the first chamber. In this embodiment, the sealing-fluid pressure may be controlled in response to changes in engine operating conditions, such as load, and the sealing-fluid pressure is used to control the fuel pressure in the fuel chamber.

In one embodiment, the fuel supply system further comprises a controllable fuel pressure regulator for regulating the fuel pressure within the fuel chamber in response to changes in engine load. Whereas typical mechanical devices employ fuel supplied at a constant pressure, the present apparatus and method is particularly suited to systems where the fuel pressure is intentionally varied in response to changes in engine load.

The sealing-fluid is preferably a liquid, such as, for example, liquid diesel fuel or hydraulic fluid. Although the present fluid seal apparatus may be employed for mechanical devices that use liquid or gaseous fuels, the apparatus is particularly useful for mechanical devices that employ hydraulic systems and pressurized gaseous fuels since leakage of a gas into a hydraulic fluid may jeopardize the operation of the hydraulic system. In a preferred embodiment, the gaseous fuel is selected from the group consisting of natural gas, hydrogen, and liquefied petroleum gas.

In a preferred application, the mechanical device is a fuel injection valve for an internal combustion engine. For example, within an injection valve, a fluid seal may be needed to seal a fuel chamber that has a moveable valve needle (that is, the moveable component) extending into a fuel chamber. In this example, the valve needle is moveable between a closed position and an open position for injecting fuel from the fuel chamber through at least one nozzle orifice into a combustion chamber of the engine. Nevertheless, it will be apparent to those skilled in the art that the present invention may be applied generally to mechanical devices that employ a fluid seal to prevent the escape of another fluid.

In a preferred embodiment, the pressure-balancing device is external to the fuel injection valve, and may serve more than one injection valve in a common rail arrangement.

In a first preferred embodiment of the pressure-balancing device the control member comprises a piston moveable within a cylinder. The piston separates the first chamber from the second chamber and the sealing-fluid pressure is balanced against the fuel pressure by controlling the sealing fluid pressure to maintain the piston in an equilibrium position.

In a preferred embodiment, the pressure-balancing device is biased so that the piston is in equilibrium when sealing-fluid pressure within the first chamber is a predetermined amount higher than fuel pressure within the second chamber. For example, a spring could be employed to bias the pressure-balancing device. Alternatively, the pressure-balancing device could be biased by employing a piston that has a first effective surface area facing the first chamber that is smaller than a second effective surface area facing the second chamber.

The pressure-balancing device may further comprise a piston rod associated with the piston that extends through the first chamber and outside the cylinder. The piston rod may be used to help guide the movements of the piston and by being associated with the piston surface that faces the first chamber, the piston rod reduces the first effective surface area and helps to bias the pressure-balancing device.

A sensor may be used to detect movement of the piston within the cylinder and to emit a signal representative of the piston movements to a sealing-fluid control unit. The sensor may detect piston movement or piston location directly within the cylinder. Alternatively, if a piston rod is employed, the sensor may detect the movement or position of the piston rod to determine the movement or position of the piston. The sealing-fluid control unit may be employed to control sealing-fluid pressure within the first chamber and the fluid seal in response to the signal.

The sealing-fluid supply system may comprise suitable conventional device for pressurizing the sealing-fluid when more pressure is needed in the fluid seal. For example, the sealing-fluid supply system may comprise a sealing-fluid pump that is controllable by the sealing-fluid control unit to control the pressure of the sealing-fluid within the first chamber of the pressure-balancing device and the fluid seal. To reduce the effect of pressure pulses in the sealing fluid supply system, the system may further comprise a pulsation damper downstream of the sealing-fluid pump and upstream of the pressure-balancing device.

In a second preferred embodiment of the pressure-balancing device, a fluid regulator valve controls the flow of the sealing-fluid to the fluid seal. A fluid passage within the valve is openable to control the flow of the sealing-fluid through the fluid passage and on towards the fluid seal. The fluid passage comprises the first chamber and the second chamber is a control chamber that is fluidly connected to the fuel supply system. The control member is moveable in response to changes in the fuel pressure within the control chamber. In this embodiment, the control member may comprise a diaphragm and the fluid regulator valve may be a diaphragm-operated pressure control valve, wherein the diaphragm is deformable in response to changes in the fuel pressure within the control chamber. Instead of a diaphragm, the control member may comprise a piston that is moveable within a cylinder that is part of the control chamber.

In combinations with the second preferred embodiment of the pressure-balancing device, the fluid regulator valve is operable to control the sealing-fluid pressure downstream of the fluid regulator valve to be equal to or greater than the fuel pressure within the second chamber. In this embodiment, the fluid seal apparatus may further comprise:

(c) a sensor for detecting a sealing-fluid pressure at a location within the sealing-fluid supply system downstream from a sealing-fluid pump and emitting a signal that is representative of the sealing-fluid pressure; and (d) a sealing-fluid flow control unit in communication with the sensor for receiving the signal, the control unit controlling the sealing-fluid pump in response to the signal to maintain the sealing-fluid pressure at the sensor location at a pressure that is higher than the fuel pressure within the fuel chamber.

In this embodiment, the sealing-fluid pressure upstream of the fluid regulator valve is kept higher than the fuel pressure within the fuel chamber. This ensures that sealing-fluid can be supplied to the fluid seal through the fluid regulator valve to provide a sealing-fluid pressure within the fluid seal that is higher than the fuel pressure within the fuel chamber. Accordingly, the sensor is preferably located upstream of the fluid regulator valve. The sensor may comprise an instrument, such as a pressure transducer for measuring the sealing-fluid pressure in a fluid passage.

The fluid seal apparatus may further comprise a pulsation damper downstream of the sealing-fluid pump and upstream of the fluid regulator valve.

In a variation of this embodiment, the fluid regulator valve is operable to control the re-circulation of sealing fluid within the sealing-fluid supply system to control the sealing fluid pressure upstream of the fluid regulator valve to be equal to or greater than fuel pressure within the second chamber. In this arrangement, the sealing-fluid supplied to the fluid seal is taken from upstream of the fluid regulator valve, which is operated to control the upstream pressure by controlling the amount of sealing-fluid that is re-circulated. A pressure sensor may be employed to measure the sealing-fluid pressure within the sealing-fluid supply system between the sealing-fluid pump and the fluid regulator valve.

In a third preferred embodiment of the pressure-balancing device a fluid regulator valve is operable to control the flow of the fuel flowing to the fuel chamber so that pressure within the fuel chamber is less than or equal to pressure within the fluid seal. The first chamber of the pressure-balancing device is a control chamber that is fluidly connected to the sealing-fluid within the sealing-fluid supply system. A fluid passage within the valve is openable to control the flow of the fuel through the fluid passage. The fluid passage comprises the second chamber. The control member is moveable in response to changes in the sealing-fluid pressure within the control chamber.

The fluid regulator of this embodiment of the pressure-balancing device may comprise a control member that comprises a diaphragm. That is, the fluid regulator valve may be a diaphragm-operated pressure control valve wherein the diaphragm is deformable in response to changes in sealing-fluid pressure within the control chamber. In an alternative arrangement, the control chamber may be a cylinder and the control member may comprise a piston that is moveable within the cylinder.

This embodiment of the fluid seal apparatus may further comprise a pressure sensor and a sealing-fluid flow control unit for controlling a sealing-fluid pump in response to a signal emitted from the sensor. The sensor detects a sealing-fluid pressure at a location within the sealing-fluid supply system downstream of the sealing-fluid pump. In a preferred embodiment, the sealing-fluid control unit receives a signal from the sensor and data relating to engine operating conditions. The control unit is calibrated to control the sealing-fluid pump in response to the sensor signal and the engine operating condition data to provide sealing-fluid pressure within the fluid seal that is predetermined by the engine operating conditions. That is, the sealing-fluid pressure is determined by the engine operating conditions and the fuel pressure within the fuel chamber is controlled in response to changes in sealing-fluid pressure.

The pressure sensor is preferably upstream of the fluid regulator valve and may comprise, for example, a pressure transducer for measuring sealing-fluid pressure. The apparatus may further comprise a pulsation damper downstream of the pump and upstream of the fluid regulator valve and pressure sensor to reduce the pressure pulses created by the sealing-fluid pump.

An alternative embodiment of this arrangement employs a re-circulation loop and a flow control valve that is controllable to control the sealing-fluid pressure within the fluid seal by controlling the amount of sealing-fluid that is re-circulated within the sealing-fluid supply system.

An additional feature of the preferred embodiments of the fluid seal apparatus is a pressure-relief loop, which includes a fluid passage for recycling at least a portion of the sealing-fluid within the sealing-fluid supply system when the sealing-fluid pressure within the fluid seal is greater than a predetermined value. The selected predetermined value is a value less than, by an appropriate safety factor, the burst pressure of the components of the sealing-fluid supply system and the system as a whole. The pressure-relief loop may further comprise a pressure-relief valve for automatically controlling the amount of sealing-fluid that is recycled.

A method is disclosed for dynamically controlling sealing-fluid pressure within a fluid seal that provides sealing to a fuel chamber within an injection valve for an internal combustion engine. The injection valve comprises a moveable component penetrating through an opening in a wall of the fuel chamber and the fluid seal provides sealing by being disposed within the opening to prevent fuel from leaking through a clearance gap between the moveable component and the opening. The sealing-fluid pressure is dynamically controlled within the fluid seal so that it is equal to or higher than fuel pressure within the fuel chamber by balancing the sealing-fluid pressure upstream of the fluid seal with the fuel pressure upstream of the fuel chamber.

The method is particularly useful when fuel pressure within the fuel chamber is controlled to change in response to changes in engine operating conditions such as engine load and engine speed.

In a preferred embodiment of the method, the method further comprises controlling the sealing-fluid pressure in response to the instant engine load condition whereby the method further comprises:

(a) controlling sealing-fluid pressure within the fluid seal so that it is greater than fuel pressure within the fuel chamber when the engine is under load; and (b) controlling sealing-fluid pressure within the fluid seal so that it is substantially equal with fuel pressure within the fuel chamber when the engine is not under load.

In a preferred method, balancing the respective sealing-fluid and fuel pressures is accomplished by maintaining a piston in an equilibrium position within a cylinder.

In another preferred method, balancing the respective sealing-fluid and fuel pressures is accomplished by controlling the flow of sealing-fluid directed to the fluid seal in response to changes in fuel pressure within a control chamber of a fluid regulator valve that regulates the flow of sealing-fluid to the fluid seal. In this embodiment, the fuel pressure is controlled in response to changes in engine operating conditions. Changes in fuel pressure are communicated to the fluid regulator valve via the control chamber, which is in fluid communication with the fuel supply system.

In yet another preferred method, balancing the respective sealing-fluid and fuel pressures is accomplished by controlling the flow of fuel directed to the fuel chamber in response to changes in sealing-fluid pressure within a control chamber of a fluid regulator valve that regulates the flow of fuel to the fuel chamber. According to this method, the sealing-fluid pressure is controlled in response to changes in the engine operating conditions and as a consequence of controlling the sealing-fluid pressure, the fuel pressure is indirectly controlled since the control chamber is in fluid communication with the sealing-fluid supply system.

Any one of the preferred methods may be further combined with measuring the sealing-fluid pressure upstream of a pressure-balancing device and controlling a sealing-fluid pump upstream of the pressure-balancing device to maintain a sealing-fluid pressure upstream of the pressure-balancing device that is higher than the fuel pressure within the fuel chamber. The method may further comprise reducing pressure pulses downstream of the sealing-fluid pump by directing the sealing-fluid through a pulsation damper, which is preferably upstream of the pressure-balancing device.

DETAILED DESCRIPTION OF PREFERRED EMBODIMENT(S)

A fluid seal apparatus and method for dynamic sealing-fluid pressure control may be employed with various types of mechanical devices that require sealing around rotating, reciprocating, sliding, or otherwise moving components. Although the present fluid seal apparatus and associated method are described for use in a fuel injection valve for an internal combustion engine, such description is intended to be illustrative and not limiting.

Figure 1:
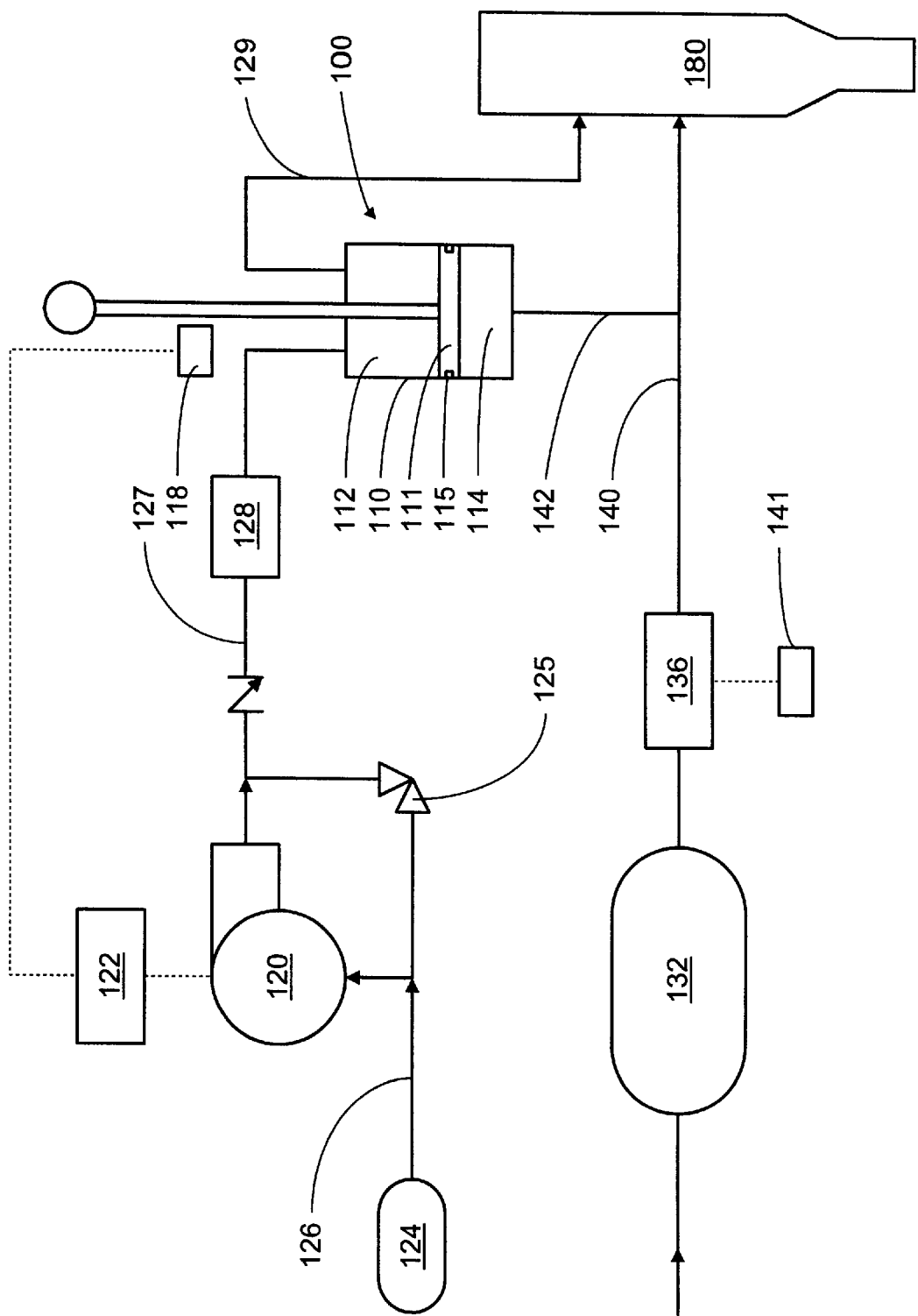
FIG. 1 is a schematic diagram depicting a preferred embodiment of a fluid seal apparatus that employs a pressure-balancing device comprising a balancing cylinder, which is used to equalize the pressures of a sealing-fluid and a fuel.

An external dynamic pressure-balancing system is used to maintain the pressure of the sealing-fluid as close as possible to, but not less than, the fuel pressure. FIG. 1 schematically illustrates one embodiment of an external dynamic pressure-balancing system that employs a pressure-balancing device 100, which comprises pressure-balancing cylinder 110. Pressure-balancing cylinder 110 contains a displaceable piston 111 separating chambers 112 and 114. Cylinder seal 115 may be disposed around piston 111 to substantially seal between the side edges of piston 111 and the interior wall of pressure-balancing cylinder 110. Cylinder seal 115 may be of a known type of seal. In the embodiment of FIG. 1, the surface area of piston 111 that faces chamber 112 is substantially equal to the surface area of piston 111 that faces chamber 114, except for the area occupied by the cross-sectional area of the piston rod that passes through chamber 112. Accordingly, the effective surface area of piston 111 that faces chamber 112 is slightly less than the effective surface area of piston 111 that faces chamber 114. This arrangement results in the sealing-fluid pressure within chamber 112 being slightly higher than the fuel pressure within chamber 114 when piston 111 is stationary and in an equilibrium position. When the pressure of one of the fluids changes, piston 111 is displaced. A sensor such as position detector 118 detects the movement and position of piston 111 within pressure-balancing cylinder 110. Position detector 118 may be a suitable device such as, for example, an optical sensor, a linear potentiometer, a mechanical device, or a limit switch that detects when the piston is at either end of a pre-determined desired range of motion.

Sealing-fluid pump 120 pumps sealing-fluid to chamber 112. Sealing-fluid flow control unit 122 uses information from position detector 118 to dynamically control sealing-fluid pump 120 to maintain the desired position of piston 111 within pressure-balancing cylinder 110, for example, a position within a range bounded by two preset limits. Pump 120 may be controlled by known means including pneumatically, hydraulically or by electronic signals from sealing-fluid flow control unit 122.

A liquid sealing-fluid such as, for example, diesel fuel or hydraulic fluid, flows from supply tank 124 through line 126 to pump 120. Pump 120 may be driven mechanically by the engine, pneumatically, or electrically. A pressure-relief device 125 may be in fluid communication with the sealing-fluid downstream of pump 120 in line 127. The sealing-fluid flows through line 127 from pump 120 to chamber 112. The sealing-fluid flowing through line 127 may also flow through an optional pulsation damper 128. The inclusion of pulsation damper 128 may depend in part upon the type of sealing-fluid pump employed. For example, it may be desirable to include pulsation damper 128 when pump 120 is a recipro-cating piston pump that produces more pronounced pressure pulses. Finally, sealing-fluid from chamber 112 flows through line 129 to injection valve 180.

The fuel that is delivered to injection valve 180 is also in fluid communication with the pressure-balancing device. The source of the fuel is a conventional fuel supply system that preferably employs accumulator 132 to provide a ready supply of high-pressure fuel. The fuel is reduced to injection pressure by fuel regulator 136 and flows through supply line 140 to injection valve 180. In a preferred embodiment, fuel regulator 136 varies the fuel pressure according to engine load conditions, and fuel regulator 136 may be controlled by known means including pneumatically, hydraulically or by an electronic signal from electronic control unit 141. Down-stream of fuel regulator 136, line 142 branches from line 140 to provide fuel to chamber 114 in pressure-balancing cylinder 110.

Pressure balancing cylinder 110 thus comprises two chambers on opposite sides of piston 111, namely chamber 112, which contains sealing-fluid and chamber 114, which contains fuel. By dynamically controlling the pressure of the sealing-fluid in response to changes in the position of piston 111, the pressure of the sealing-fluid is dynamically con-trolled in response to changes in the fuel pressure. If the surface area of piston 111 that faces chamber 112 is sub-stantially equal to the opposite surface area that faces chamber 114, when piston 111 is in equilibrium, the pressure of the sealing-fluid within chamber 112 is substantially equal to the pressure of the fuel within chamber 114. According to the arrangement shown in FIG. 1, when piston 111 is in equilibrium, the pressure of the fuel within injection valve 180 is substantially equal to the pressure of the sealing-fluid within the fluid seal disposed within injection valve 180. The limits to the range of movement of piston 111 can be controlled to have a wide range of values from practically a singular location or set point, to almost the entire stroke of piston 111 within pressure-balancing cylinder 110. Position detector 118 sends an electronic signal indicating the posi-tion of piston 111 within balancing cylinder 110 to sealing-fluid flow control unit 122. Sealing-fluid flow control unit 122 may be, for example, a suitable electronic control unit (ECU) which is capable of receiving signals representing the position of piston 111 and outputting a signal for controlling pump 120 to selectively stop or start pump 120, or to operate pump 120 at varying flow rates.

If the fuel pressure within injection valve 180 is reduced, the corresponding pressure change is immediately commu-nicated to chamber 114 through lines 140 and 142. A pressure drop in chamber 114 results in movement of piston 111 within pressure-balancing cylinder 110 to reduce the volume of chamber 114 (increasing the volume of chamber 112). The movement of piston 111 is detected by position detector 118, which electronically communicates with sealing-fluid flow control unit 122. In response to the signal received from sensing device 118, sealing-fluid flow control unit 122 reduces the sealing-fluid flow through pump 120, thereby reducing the flow of sealing-fluid into chamber 112.

Conversely, if the pressure of the fuel within injection valve 180 increases, then piston 111, under the increased pressure, moves within pressure-balancing cylinder 110 to increase the volume of chamber 114 (decreasing the volume of chamber 112). The movement of piston 111 is detected by position detector 118, which electronically communicates with sealing-fluid flow control unit 122. Sealing-fluid flow control unit 122 then controls pump 120 to increase the flow of sealing-fluid into chamber 112. In this manner the posi-tion of piston 111 is maintained within a range between preset positions within cylinder 110.

Using pressure-balancing device 100 to equalize the pres-sure of the sealing-fluid and the fuel upstream from injection valve 180 results in the pressure of these fluids being substantially equal within injection valve 180 when injection valve 180 is closed (that is, when fuel injection valve 180 is not injecting fuel). However, when injection valve 180 periodically opens, as it does at a very high frequency when the engine is running, the pressure of the fuel within injection valve 180 is reduced relative to the pressure of the sealing-fluid. Accordingly, during normal engine operation the fuel pressure within injection valve 180 is slightly lower than the sealing-fluid pressure. Consequently, during normal operation, the pressure differential within injection valve 180 results in a continuous bleed of sealing-fluid into the fuel passages within injection valve 180. However, the amount of leakage is greatly reduced compared to conventional arrangements that do not provide dynamic pressure-balancing because in the present system sealing-fluid pressure is dynamically controlled to follow changes in fuel pressure while ensuring that sealing-fluid pressure within injection valve 180 is higher than fuel pressure.

Because a small amount of sealing-fluid bleeds into the fuel within injection valve 180, the bled sealing-fluid is injected into the combustion chamber along with the fuel and is consumed in the engine. Accordingly, in addition to the effects of changing fuel pressure on the position of piston 111, piston 111 may also move in response to consumption of sealing-fluid within injection valve 180. As sealing-fluid is consumed, sealing-fluid flows from chamber 112 to injection valve 180, causing a reduction in the volume of chamber 112 and consequent movement of piston 111. Position detector 118 detects such movement and sealing-fluid flow control unit 122 controls pump 120 to pump more sealing-fluid into chamber 112 to maintain the sealing-fluid level in chamber 112 and thus compensating for sealing-fluid consumption.

Conversely, if the amount of sealing-fluid pumped to chamber 112 is greater than the amount of sealing-fluid being consumed, then there will be an increase in the volume of chamber 112 and piston 111 will move accordingly, and position detector 118 will again detect such movement. Position detector 118 communicates such movement to sealing-fluid flow control unit 122, which controls pump 120 to reduce or stop the flow of sealing-fluid to chamber 112 from supply tank 124.

Thus, piston 111 is controlled in the above-described manner to move within the preset range within pressure-balancing cylinder 110. If piston 111 moves outside of the preset range of movement in a direction that decreases the volume of chamber 112 (upwards in FIG. 1), and activating pump 120 to pump more sealing-fluid has no effect, position detector 118 indicates a failure in the sealing-fluid supply system. If the failure can not be corrected (that is, if the position of piston 111 can not be returned to a position within the preset range), then the engine may be shut down.

It should be understood that with respect to FIG. 1, sealing-fluid lines 127 and 129 connected to chamber 112 can be replaced with a continuous sealing-fluid line from pump 120 to injection valve 180, with a single branch line fluidly connecting the continuous sealing-fluid line to chamber 112. Equally, fuel lines 140 and 142 can be replaced with a line fluidly connecting fuel regulator 136 to chamber 114 and a fuel line connecting chamber 114 to injection valve 180. Various combinations of these fluid line configurations will function in the present fluid sealing system.

It should be understood that it is desirable for the pressure-balancing system to react to changes in the position of piston 111 as quickly as possible to counteract pressure differentials and to maintain the position of piston 111 within the preset range.

Figure 2A:
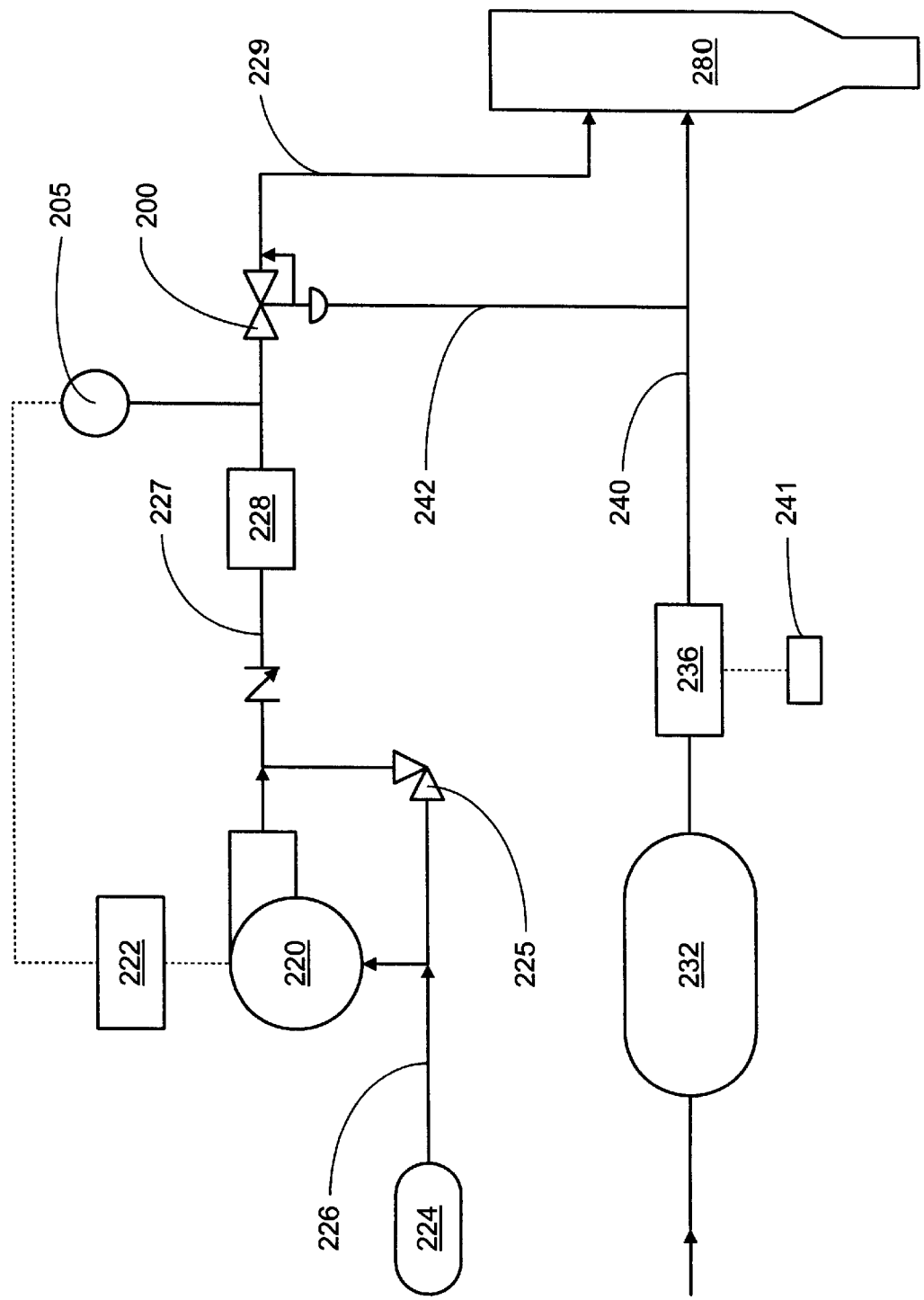
FIG. 2A is a schematic diagram depicting another preferred embodiment of a fluid seal apparatus that employs a pressure-balancing device comprising a fluid regulator valve for controlling the flow of sealing-fluid to the injection valve.

FIG. 2A depicts an alternate embodiment of an external pressure-balancing system wherein the pressure-balancing device comprises fluid regulator valve 200 and pressure sensing device 205. In a preferred embodiment, fluid regulator valve 200 may be, for example, a dome loaded regulator valve, such as a piston or diaphragm operated pressure control valve. Other than the components of the pressure-balancing device, many of the components of the sealing-fluid and fuel injection systems are similar to the components of the corresponding systems shown in FIG. 1. For example, pump 220, controlled by sealing-fluid control unit 222, pumps sealing-fluid to injection valve 280 via fluid regulator valve 200. Sealing-fluid flows to the suction inlet of pump 220 from supply tank 224 through sealing-fluid line 226. Sealing-fluid flows from pump 220 to fluid regulator valve 200 through sealing-fluid line 227 and through optional pulsation damper 228. Pressure relief device 225 may also be provided in fluid communication with sealing-fluid line 227 to limit the maximum pressure of the sealing-fluid downstream of pump 220. Sealing-fluid is finally directed from fluid regulator valve 200 to injection valve 280 through sealing-fluid line 229. The illustrated components of the fuel supply system, namely fuel accumulator 232, fuel regulator 236, line 240 and electronic control unit 241, generally correspond to the like components of FIG. 1 (identified by reference numbers 132, 136, 140 and 141 respectively). Fuel line 242, which branches from fuel line 240 fluidly, connects fuel line 240 with a control chamber (not shown) of fluid regulator valve 200. In this way, the pressure of the fuel in fuel line 240 is communicated to fluid regulator valve 200.

As the pressure of the fuel in the control chamber of fluid regulator valve 200 fluctuates, fluid regulator valve 200 dynamically controls the pressure within sealing-fluid line 229 to be the same or slightly higher than the pressure of the fuel within fuel line 240. Fluid regulator valve 200 thereby dynamically controls the sealing-fluid pressure to follow the pressure of the fuel flowing through fuel line 240 and within the fuel chamber of injection valve 280. When fluid regulator valve 200 is a diaphragm-operated pressure control valve, it can be biased by a spring such that the sealing-fluid pressure downstream of fluid regulator valve 200 is always slightly above the fuel pressure within the control chamber.

Pressure sensor 205 may be, for example, a transducer or other known device for measuring pressure in a fluid passage. Pressure sensor 205 is located on sealing-fluid line 227 upstream of fluid regulator valve 200. Pressure sensor 205 causes an electronic signal representative of the detected pressure to be transmitted to sealing-fluid control unit 222. Sealing-fluid control unit 222 uses the pressure signal to control pump 220. Sealing-fluid control unit 222 is calibrated such that pump 220 maintains the pressure within sealing-fluid line 227 at a level which is above the maximum anticipated fuel pressure supplied by fuel regulator 236, and below the maximum pressure that can be withstood by pump 220 and the components of the sealing-fluid system downstream of pump 220.

If the fuel pressure is reduced by electronic control unit (ECU) 241, which controls fuel regulator 236, the pressure change is immediately communicated through fuel line 242 to the control chamber of fluid regulator valve 200, which in turn reduces the pressure of the sealing-fluid downstream of fluid regulator valve 200. In this manner, the pressure within sealing-fluid line 229 is maintained at a level that is equal to or slightly higher than the pressure of the fuel in line 240. The magnitude of the pressure differential depends upon how fluid regulator valve 200 has been calibrated. Conversely, if the fuel pressure increases, the pressure change is again immediately communicated through fuel line 242 to the control chamber of fluid regulator valve 200, which in turn increases the pressure within sealing-fluid line 229 so that the sealing-fluid pressure is again equal to or slightly higher than the pressure of the fuel in line 240.

It should be understood that with respect to FIG. 2A, fuel lines 240 and 242 could be replaced with a fuel line that fluidly connects fuel regulator 236 to the control chamber of fluid regulator valve 200 and a second fuel line that fluidly connects the control chamber of fluid regulator valve 200 to injection valve 280.

Figure 2B:
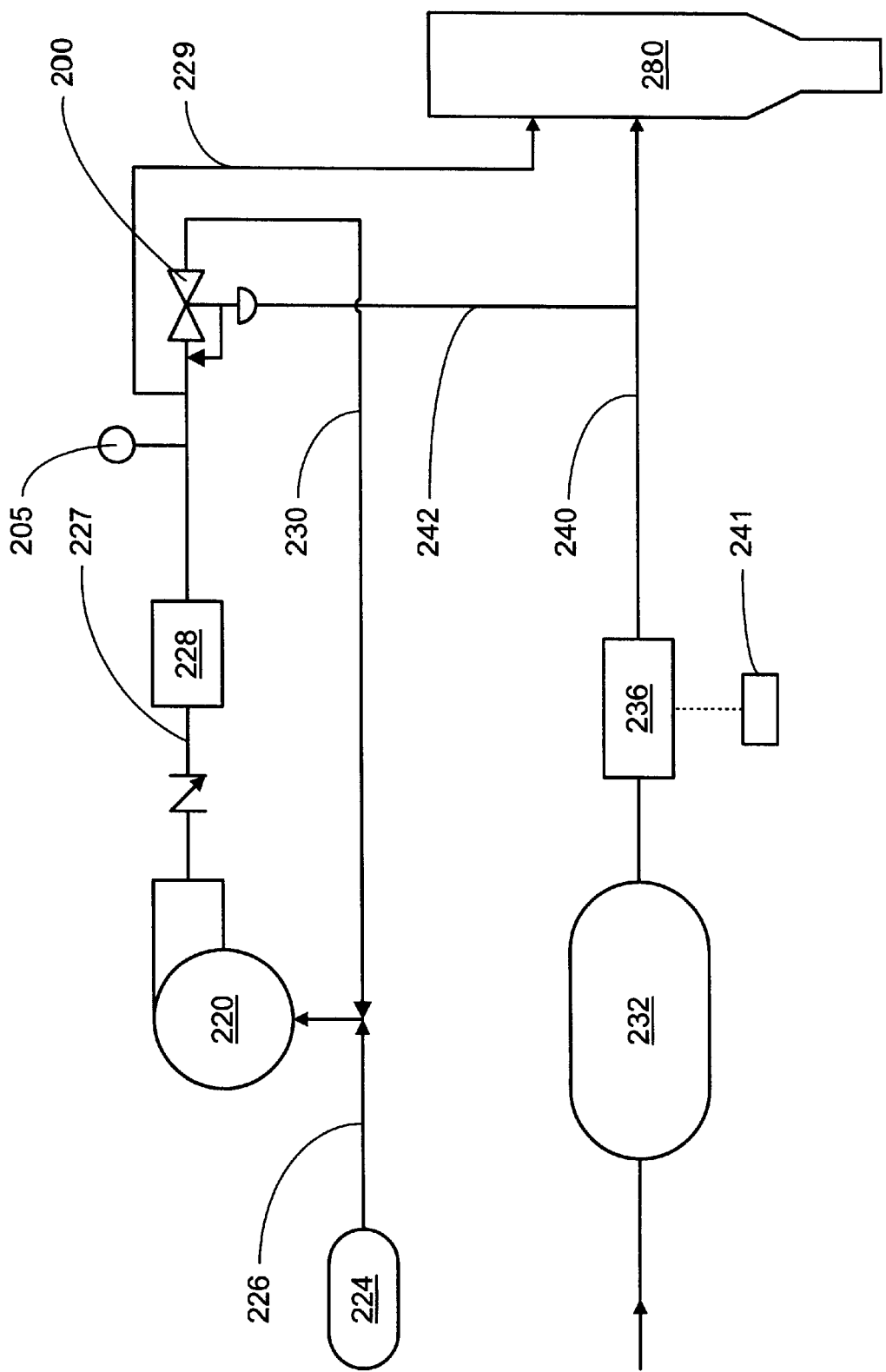
FIG. 2B is a schematic diagram depicting a variation of the embodiment of FIG. 2A wherein the fluid regulator valve is a back-pressure regulator that controls the pressure of the sealing-fluid within the fluid seal by controlling the amount of sealing-fluid that is re-circulated within the sealing-fluid supply system.

FIG. 2B is an alternative arrangement to the embodiment of FIG. 2A. Equivalent components of these two embodiments are identified by equivalent reference numbers. The embodiment of FIG. 2B, like the embodiment of FIG. 2A, employs fluid regulator valve 200, which is operable to control sealing-fluid pressure within the fluid seal by controlling the pressure and flow of sealing-fluid within line 229. However, the embodiment of FIG. 2B employs an arrangement whereby the sealing-fluid pressure upstream of fluid regulator valve 200 is controlled by controlling the amount of sealing-fluid that is re-circulated within the sealing-fluid supply system through line 230. In the embodiment of FIG. 2B, pump 220 can operate at full capacity to ensure that sufficient sealing-fluid is available on demand, thus reducing the complexity of the control system since a sealing-fluid flow control unit like control unit 222 in FIG. 2A is not required. In the embodiment of FIG. 2B, pressure sensor 205 is not required to provide data for controlling pump 220. However, pressure sensor 205 may still be employed to check the sealing-fluid pressure to ensure that fluid regulator valve 200 is working properly.

Figure 3A:
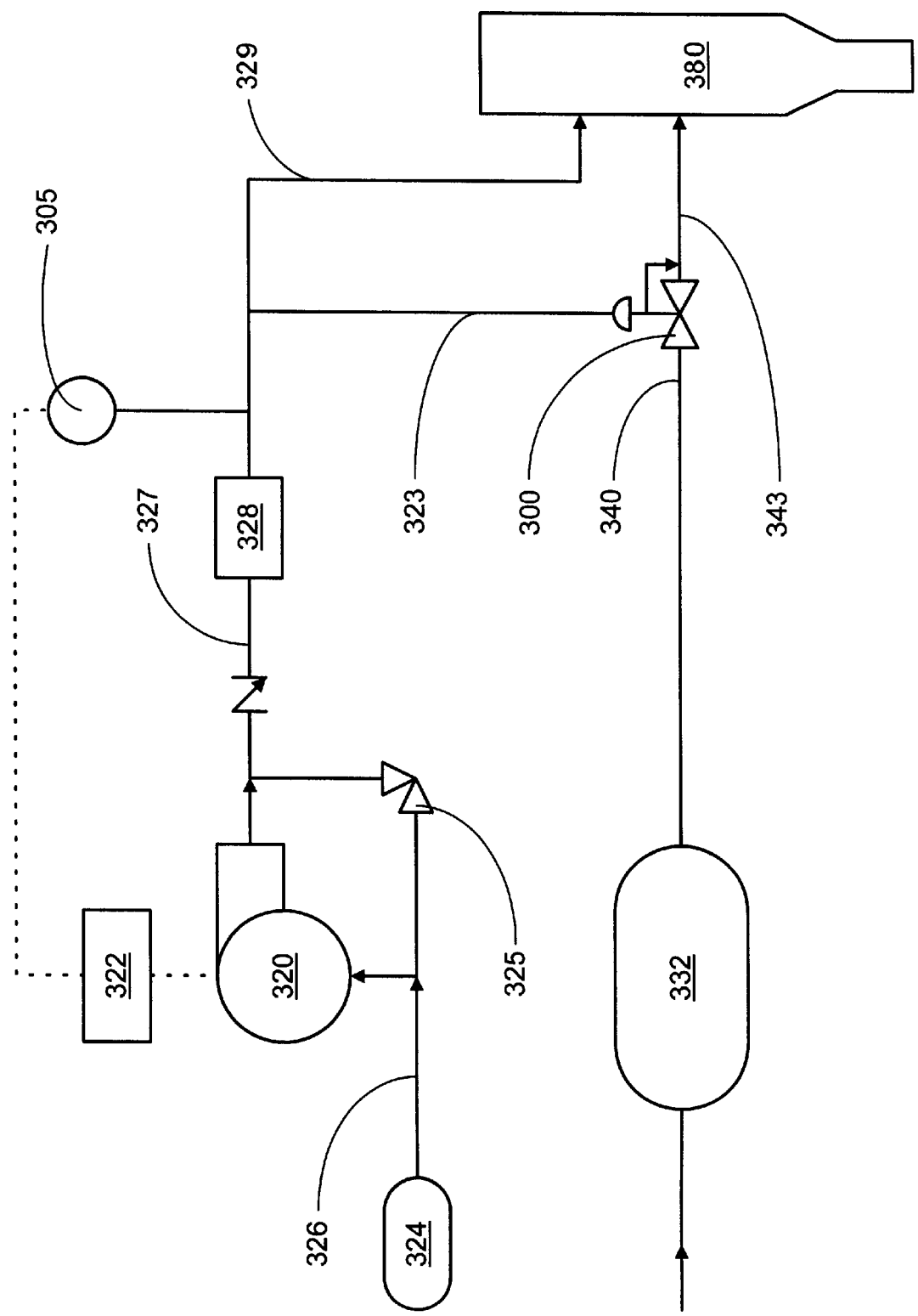
FIG. 3A is a schematic diagram depicting yet another preferred embodiment of a fluid seal apparatus that employs a pressure-balancing device comprising a fluid regulator valve for controlling the flow of fuel to the injection valve, in which the pressure of the fuel is controlled indirectly by controlling the pressure of the sealing-fluid.

FIG. 3A depicts yet another preferred embodiment of a fluid seal apparatus that comprises fluid regulator valve 300 and pressure sensing device 305. Like fluid regulator valve 200 in the embodiment of FIGS. 2A and 2B, fluid regulator valve 300 may be a dome-loaded regulator valve such as a diaphragm-operated pressure control valve or a piston-operated pressure control valve. In this embodiment, fluid regulator valve 300 controls the flow and pressure of the fuel supplied to injection valve 380. However, in this embodiment, the dynamic control of the sealing-fluid pressure is governed directly by the engine load conditions. The desired sealing-fluid pressure is calibrated to match or be slightly higher than the desired fuel pressure for the operating range of engine load conditions. When the engine is operating and the sealing-fluid pressure is dynamically controlled in response to engine load conditions, the fuel pressure is indirectly controlled by the sealing-fluid pressure. That is, sealing-fluid is directed through line 323 to a control chamber of fluid regulator valve 300. The pressure of the sealing-fluid within the control chamber acts on a control member to regulate the flow of fuel through fluid regulator valve 300 and on to injection valve 380. Accordingly, in this embodiment, the fuel pressure is indirectly controllable by controlling the sealing-fluid pressure. Sealing-fluid flows to pump 320 from supply tank 324 through sealing-fluid line 326. Pump 320 pumps sealing-fluid through sealing-fluid line 327, and through optional pulsation damper 328, before flowing through sealing-fluid line 329 to injection valve 380. As described above, sealing-fluid line 323 provides a fluid passage for directing sealing-fluid to a control chamber of fluid regulator valve 300 to link the fuel pressure control to the pressure within sealing-fluid line 329.

As in the previously-described embodiments, in the embodiment of FIG. 3A the fuel is delivered to accumulator 332 from a conventional fuel supply system. In the illustrated preferred embodiment, fuel flows from accumulator 332 through fuel line 340 to fluid regulator valve 300. As sealing-fluid pressure fluctuates in the control chamber of fluid regulator valve 300, fluid regulator valve 300 adjusts the fuel pressure accordingly. Fluid regulator valve 300 can be biased, for example, by a spring, such that the fuel pressure within fuel line 343 is always equal to, or slightly below, the pressure within sealing-fluid line 323.

When a change in fuel injection pressure is required according to engine load conditions or engine speed requirements, pump 320, controlled by pump flow regulator 322, adjusts the pressure of the sealing-fluid to the desired level. Because the sealing-fluid pressure acts on fluid regulator valve 300, the fuel pressure will automatically conform to changes in sealing-fluid pressure, with the sealing-fluid pressure preferably remaining slightly above that of the fuel pressure. Pressure sensing device 305, which may be, for example, a pressure transducer, is provided on sealing-fluid line 327 or 323. Pressure sensing device 305 communicates the pressure of the sealing-fluid upstream of fluid regulator valve 300 to sealing-fluid flow control unit 322. Thus sealing-fluid flow control unit 322 can control pump 320 to vary the sealing-fluid pressure and therefore the fuel pressure according to engine operating conditions such as engine load and speed.

It should be understood that with respect to FIG. 3A, sealing-fluid lines 323 and 329 could be replaced with a sealing-fluid line that fluidly connects pulsation damper 328 to the control chamber of fluid regulator valve 300 and a second sealing-fluid line that fluidly connects the control chamber of fluid regulator valve 300 to injection valve 380.

Figure 3B:
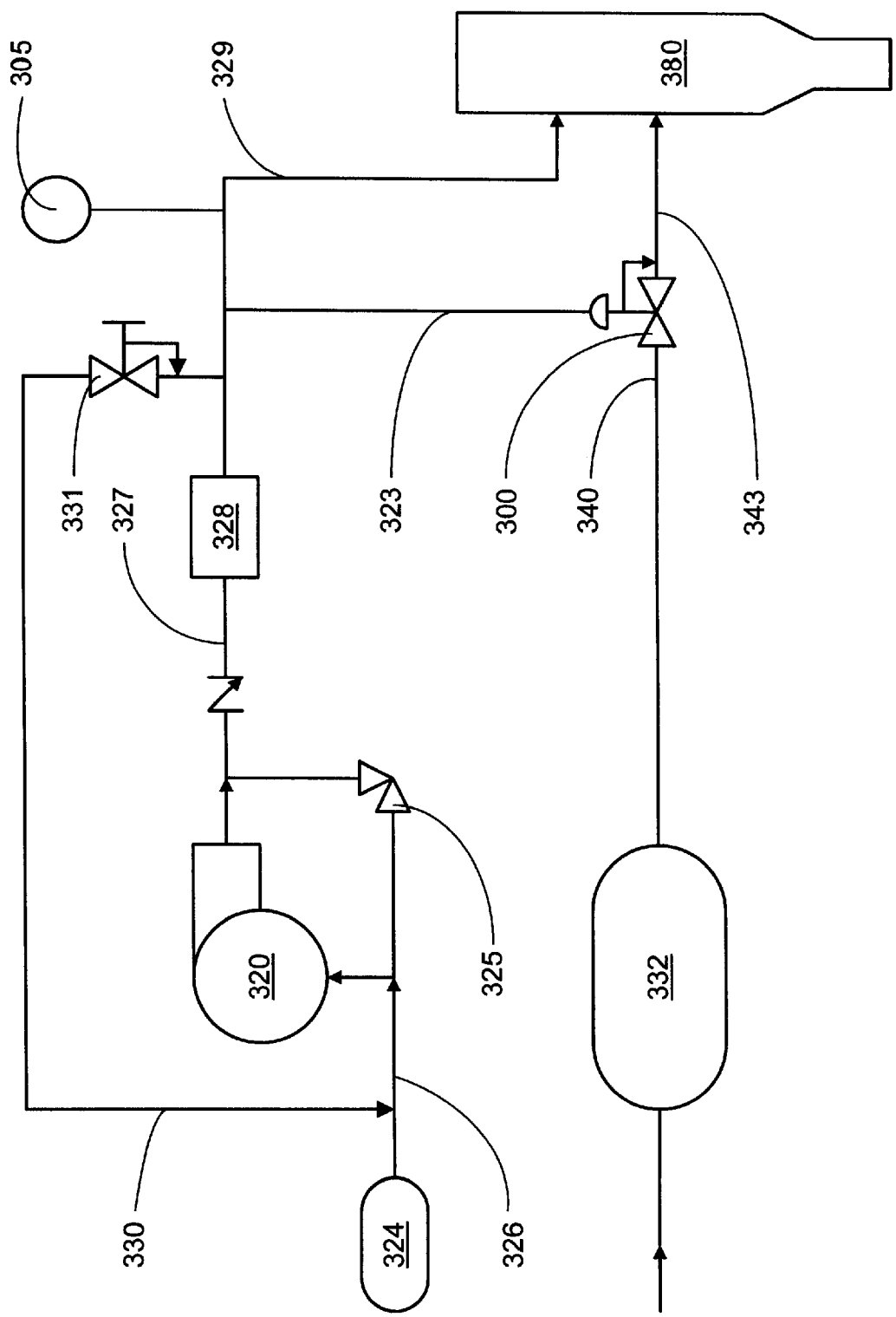
FIG. 3B is a schematic diagram depicting a variation of the embodiment of FIG. 3A in which a re-circulation loop is employed to control the pressure of the sealing-fluid supplied to the fluid seal.

FIG. 3B shows an alternative arrangement to the embodiment of FIG. 3A. Equivalent components of these two embodiments are identified by equivalent reference numbers. The embodiment of FIG. 3B, like the embodiment of FIG. 3A, employs fluid regulator valve 300, which is operable to control fuel pressure within injection valve 380 by controlling the pressure and flow of fuel within line 343. However, the embodiment of FIG. 3B employs an arrangement whereby the sealing-fluid pressure upstream of the fluid seal within injection valve 380 is controlled recirculation control valve 331, which controls the amount of sealing-fluid that is re-circulated within the sealing-fluid supply system through line 330. In the embodiment of FIG. 3B, pump 320 can operate at full capacity to ensure that sufficient sealing-fluid is available on demand. That is, pump 320 may be a fixed- or a variable-speed pump; however, pump speed is not directly controlled by fluid pressure in the present fluid seal apparatus. In this way, the complexity of the control system is reduced since a sealing-fluid flow control unit like control unit 322 in FIG. 3A is not required.

In the embodiment of FIG. 3B, pressure sensor 305 is not required to provide data for controlling pump 320. While re-circulation control valve 331 provides pressure control within the sealing-fluid supply system, pressure-relief valve 325 may still be employed to provide additional protection to guard against excessive sealing-fluid pressure. The embodiment of FIG. 3B also results in pressure sensor 305 not being required to provide data for controlling sealing-fluid pump 320. However, pressure sensor 305 may still be employed to check that re-circulation control valve is working properly.

Figure 4:
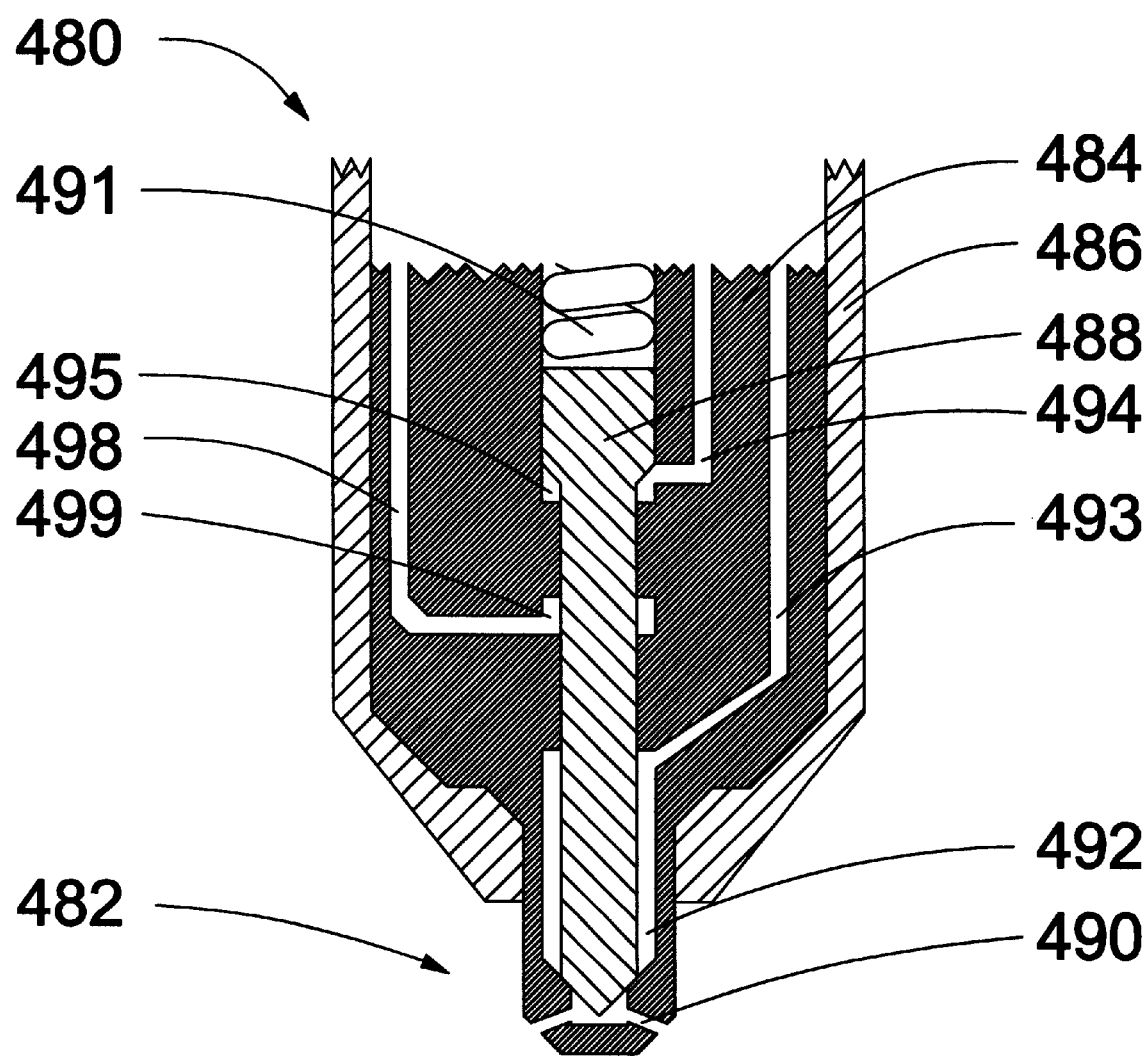
FIG. 4 is a partial cross-sectional view of a preferred embodiment of a hydraulically actuated gaseous fuel injection valve that shows a fluid seal disposed within the bore provided for the moveable valve needle for preventing leakage of gaseous fuel from the valve fuel chamber.

FIG. 4 is a partial cross-section view of one embodiment of a fuel injection valve that may be employed to introduce fuel into the combustion chamber of an internal combustion engine. Injection valve 480 features a fluid seal that may be fluidly connected to a sealing-fluid supply system such as one of the embodiments illustrated in FIGS. 1 through 3B. Injection valve 480 of FIG. 4 comprises valve tip 482, inner housing 484 and outer housing 486. Injection valve 480 is preferably a needle valve, and further includes valve needle 488, which reciprocates between open, and closed positions to allow fuel to pass through nozzle orifices 490 in valve tip 482. In the closed position, an active end of valve needle 488 that comprises a sealing surface, contacts a surface of valve tip 482, commonly known as the valve "seat", to provide a fluid-tight seal. In the open position, valve needle 488 is moved so that the sealing surface of valve needle 488 is spaced apart from the valve seat. Valve needle 488 is biased in the closed position by spring 491, which is associated with an end of valve needle 488 that is opposite the active end. As shown in the embodiment of FIG. 4, one end of valve needle 488 is disposed within a bore provided within inner housing 484 and the opposite end extends into fuel chamber 492.

In a preferred embodiment, during engine operation fuel chamber 492 is continually charged with pressurized gaseous fuel, such as natural gas at a pressure of, for example, 3000 pounds per square inch (psi) (about 20.7 MPa). Fuel chamber 492 is fluidly connected via fluid passage 493 to a source of high-pressure gaseous fuel, such as one of the fuel supply systems of FIGS. 1 through 3B. The pressure of the gaseous fuel may fluctuate depending on engine operating conditions such as engine load and speed.

Illustrated injection valve 480 is hydraulically actuated. Accordingly, to open injection valve 480, a high-pressure hydraulic fluid is directed through fluid passage 494 to actuation chamber 495. When pressure of the hydraulic fluid within actuation chamber 495 is sufficient to overcome the closing force applied to valve needle 488 by spring 491, valve needle 488 lifts away from the valve seat to the open position to allow injection of the gaseous fuel into the combustion chamber via nozzle orifices 490. To close injection valve 480, the pressurized hydraulic fluid is drained from actuation chamber 495 so that spring 491 again operates to return valve needle 488 to the closed position.

Pressurized sealing-fluid flows via conduit 498 into annular groove 499 in the surface of the valve needle bore provided in inner housing 484. Alternatively, annular groove 499 may be provided in the surface of valve needle 488. Furthermore, a helical or other shape of groove may be used. When pressurized sealing-fluid occupies annular groove 499 it forms a fluid seal. The fluid seal prevents the high-pressure gaseous fuel from leaking through the clearance gap between movable valve needle 488 and inner housing 484. The pressure of the sealing-fluid is maintained at a pressure that is equal to or preferably slightly higher than the pressure of the gaseous fuel in fuel chamber 492 so that the higher pressure sealing-fluid provides a fluid barrier against the lower pressure gaseous fuel. In this way, the fluid seal prevents the gaseous fuel from leaking into hydraulic fluid actuation chamber 495.

Fluid flow in the narrow clearance gap is laminar or restricted, thus inhibiting leakage of sealing-fluid into fuel chamber 492 and actuation chamber 495. By increasing the length of valve needle 488 and the corresponding bore within inner housing 484, and reducing the pressure difference between the sealing-fluid in annular groove 499 and the gaseous fuel in fuel chamber 492, the amount of sealing-fluid that bleeds into fuel chamber 492 can be reduced. In a preferred embodiment, the sealing-fluid also acts as a lubricant and may be the same fluid as the hydraulic fluid.

Diesel fuel is an example of a suitable sealing-fluid. Other suitable sealing-fluids could be employed such as hydraulic fluid. However, diesel fuel is a preferred sealing-fluid for dual fuel engines because it is already available from the pilot fuel supply system and diesel fuel that leaks from the fluid seal into the gaseous fuel will be burned in the engine combustion chamber. Sealing-fluid is pressurized and directed to conduit 498 from a sealing-fluid supply system that is fluidly connected to a sealing-fluid supply system such as those illustrated in FIGS. 1 through 3B. The fluid seal apparatus comprises a pressure-balancing device and dynamically controls the pressure of the sealing-fluid within annular groove 499 to be equal to or greater than (but as close as possible to) the pressure of the gaseous fuel in fuel chamber 492.

In another preferred embodiment, an optional second annular groove (not shown) may be provided in the wall of the valve needle bore similar to annular groove 499. The second annular groove is preferably located between and spaced apart from annular groove 499 and actuation chamber 495. Located in this position, sealing-fluid that leaks from annular groove 499 towards actuation chamber 495 will collect in the second annular groove, which may be fluidly connected to a vent or recycle passage (not shown).

With reference still to FIG. 4, when the engine is under load, the fuel is periodically released through nozzle orifices 490 on a continuous basis. As a result, the pressure of the fuel in fuel chamber 492 is slightly lower than its pressure immediately downstream from the fuel regulator (for example, fuel regulator 136 in FIG. 1). Because the external pressure-balancing device balances the sealing-fluid pressure with the fuel pressure immediately downstream from the fuel regulator, if the sealing-fluid pressure is controlled to be substantially equal or slightly higher at the pressure balancing device, when injection valve 480 is operating to inject fuel into the combustion chamber, the fuel pressure in fuel chamber 492 will be lower than the sealing-fluid pressure in annular groove 499. In this way, the external dynamic pressure-balancing device automatically provides a slight pressure differential that makes the seal more effective, since a sealing-fluid pressure slightly higher than the fuel pressure in fuel chamber 492 is desirable to prevent leakage. However, the pressure balancing device may comprise additional features to ensure that the sealing-fluid pressure in annular groove 499 is greater than the fuel pressure in fuel chamber 492. Because the fuel pressure is expected to fluctuate, it may be desirable to provide a margin of safety to prevent fuel leakage from fuel chamber 492, while still employing dynamic pressure control to eliminate excessive bleeding of the sealing-fluid into fuel chamber 492.

For example, with reference again to FIG. 1, pressure-balancing device 100 may employ a piston that has unequal effective end surface areas with the smaller effective surface area facing chamber 112 so that equilibrium is maintained when the sealing-fluid pressure in chamber 112 is higher than the fuel pressure in chamber 114. The piston rod is preferably located on the side of piston 111 that faces chamber 112 (as shown in FIG. 1) to reduce the effective surface area on that side of piston 111. The effective piston surface area facing chamber 112 may be reduced, for example, by increasing the diameter of the piston rod. With respect to pressure-balancing device 100 and fluid regulator valves 200 and 300, described above, a spring mechanism may be calibrated to provide a sealing-fluid pressure within annular groove 499 that is higher than the fuel pressure within fuel chamber 492.

As noted above, other features for reducing fuel leakage and sealing-fluid bleeding include reducing the diametric clearance between the bore in inner housing 484 and valve needle 488 and increasing the length of the bore.

Another advantage of the present system is realized when the engine is coasting in a fuel cut-off condition. During a fuel cut-off condition, the fuel residing in fuel chamber 492 is not being subjected to injection cycles, so to reduce the bleeding of sealing-fluid into the fuel chamber, it is desirable to equalize the sealing-fluid pressure with the fuel pressure at the pressure-balancing device so that the pressure of the fuel in fuel chamber 492 is substantially balanced with the pressure of the sealing-fluid in annular groove 499. Similarly, when the pressure-balancing device is calibrated to provide a slight pressure differential to maintain a higher sealing-fluid pressure, it is desirable to reduce this pressure differential when fuel chamber 492 is not being subjected to injection cycles. The present invention provides the flexibility to dynamically control the sealing-fluid pressure to balance sealing-fluid pressure with fuel pressure, resulting in a reduction in the amount of sealing-fluid that accumulates in fuel chamber 492 during cut-off conditions.

The present fluid sealing system may also be employed with other types of injection valves inject high-pressure fuels into the combustion chambers of internal combustion engines. For example, the present fluid sealing system may be used with poppet-type injection valves that employ a hydraulic actuation assembly to move a valve stem towards the engine combustion chamber to inject gaseous fuel, instead of illustrated injection valve 480 that lifts valve needle 488 in a direction away from the engine combustion chamber.

Figure 5:
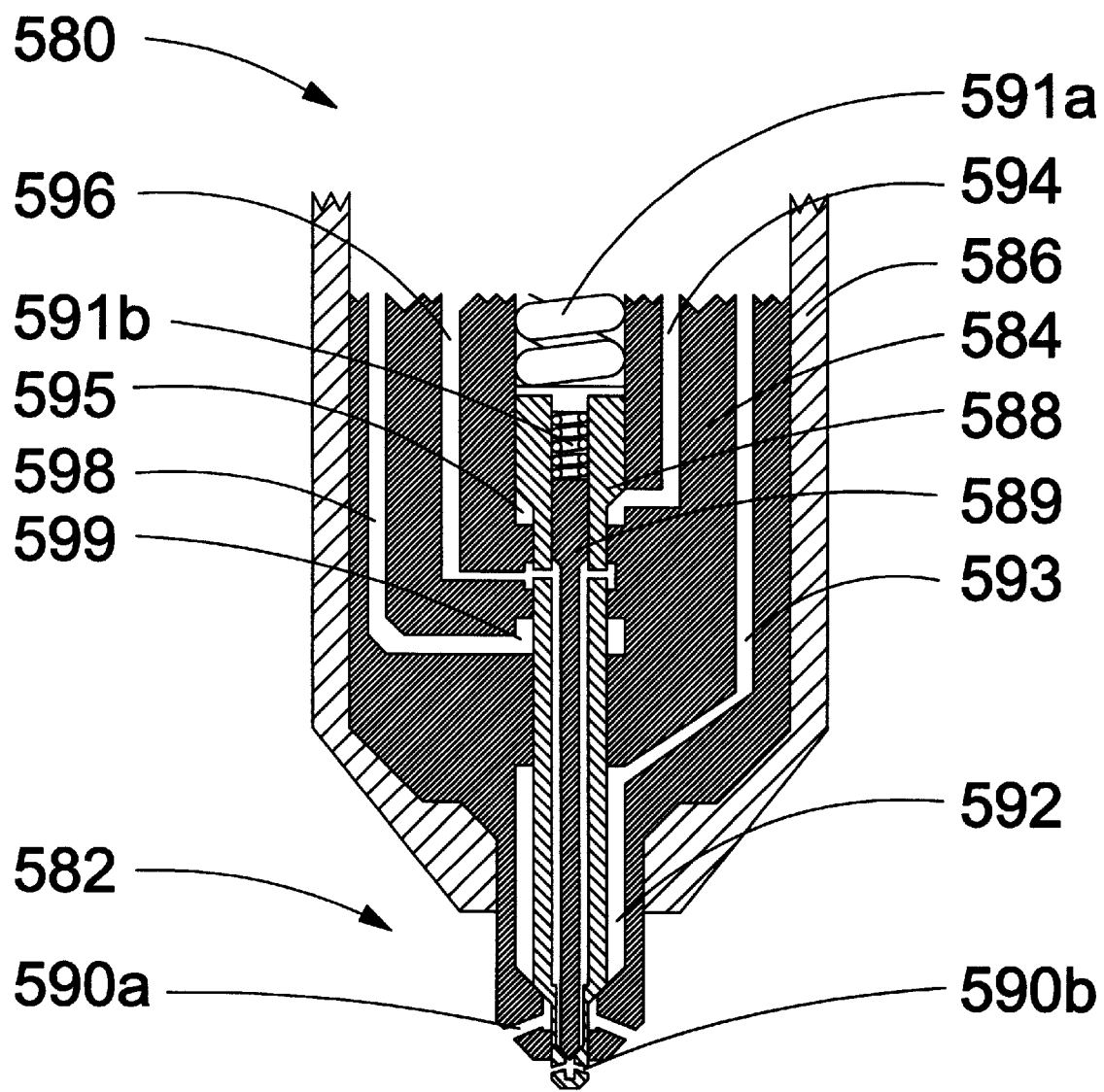
FIG. 5 is a partial cross-sectional view of another preferred embodiment of a hydraulically actuated injection valve that shows a fluid seal disposed within a bore provided for moving components of the injection valve assembly. The injection valve of FIG. 5 employs two concentrically arranged injection assemblies for injecting two separate fuel streams into a combustion chamber (not shown).

FIG. 5 depicts another embodiment of a fuel injection valve that employs a fluid seal. In FIG. 5, injection valve 580 comprises valve tip 582, inner housing 584, outer housing 586, and spring 591a, which are all similar to the correspondingly named components shown in FIG. 4, and identified by reference numbers 482, 484, 486 and 491. Illustrated injection valve 580 further comprises a concentric injection valve arrangement of the type disclosed in co-owned application Ser. No 09/075,060, which comprises an outer valve needle 588 and an inner valve needle 589. The primary fuel, controlled by outer valve needle 588, is introduced into the engine combustion chamber through primary fuel nozzle orifice 590a when valve needle 588 is lifted away from the valve seat inside valve tip 582. Secondary fuel is introduced into the engine combustion chamber through secondary fuel nozzle orifice 590b when inner valve needle 589 is lifted away from the valve seat inside outer valve needle 588.

Injection valve 580 further comprises primary fuel chamber 592 through which the primary fuel flows during injection events, and in which primary fuel resides between injection events. The primary fuel is directed to fuel chamber 592 through fluid passage 593 from a fuel supply system that is in fluid communication with a sealing-fluid supply system such as the embodiments illustrated in FIGS. 1 through 3B. Hydraulic fluid flows through fluid passage 594 to and from actuation chamber 595 to provide an actuating force against spring 591a to open the injection valve at the desired times. Secondary fuel flows through secondary fuel fluid passage 596 into the hollow interior of outer valve needle 588. In the illustrated embodiment, the pressure of the secondary fuel provides the lift force needed to compress inner spring 591b and lift inner valve needle 589 away from the valve seat within outer valve needle 588. For example, a secondary fuel pressure pulse may provide the momentary pressure needed to lift inner valve needle 589 to allow injection of secondary fuel through nozzle orifices 590b. Sealing-fluid conduit 598 fluidly connects annular groove 599 to a sealing-fluid supply system and pressure-balancing device such as those illustrated in FIGS. 1 through 3B.

When the secondary fuel is a liquid, such as, for example, diesel fuel, the secondary fuel may also be conveniently employed as the sealing-fluid. Pressurized sealing-fluid is provided to annular groove 599 in the wall of the bore in inner housing 584 within which outer valve needle 588 is disposed. A secondary fuel such as diesel fuel may be employed, for example, as a pilot fuel for assisting to initiate combustion of the gaseous fuel.

Annular groove 599 is positioned so that the fluid seal prevents leakage of the primary fuel into secondary fuel fluid passage 596 and hydraulic fluid actuation chamber 595. The pressure of the primary fuel may fluctuate according to engine load and speed. In the present fluid seal apparatus, the pressure of the sealing-fluid is preferably balanced with the pressure of the primary fuel in an external pressure-balancing device so that the sealing-fluid pressure within annular groove 599 is equal to, or slightly greater than, the pressure of the fuel within fuel chamber 592.

The present fluid sealing system may be applied to other types of dual fuel injection valves, including other arrangements of needle-type injection valves or poppet-style valves where the valve stem moves towards the engine combustion chamber to open the valve.

Although the illustrative examples of the present fluid sealing system have been directed to hydraulically actuated gaseous and dual fuel injection valves, the principles of the present fluid seal apparatus can be applied to other mechanical devices that may employ fluid seals between moveable components, such as, for example, direct injection fuel injection valves that are actuated by magnetostrictive, piezoelectric, or solenoid actuators.

It should be understood that the above description is intended for illustrative purposes only, and is not intended to limit the scope of the dynamically balanced fluid sealing system in any way. Additional known components of fuel systems, for example filters, pressure relief valves, shut-down and priming valves may of course be used in combination with the present fluid seal apparatus.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A fluid seal apparatus for a mechanical device comprising a fuel chamber that is fluidly connected to a fuel supply system, said mechanical device further comprising a moveable component extending through an opening in a wall of said fuel chamber, said fluid seal apparatus comprising:

(a) a fluid seal comprising a cavity formed within said mechanical device, said cavity in fluid communication with a gap formed between said wall and said moveable component, thereby preventing fuel within said fuel chamber from leaking through said gap, wherein said fluid seal is in fluid communication with a sealing-fluid supply system; and (b) a pressure-balancing device comprising:
   a first chamber in fluid communication with sealing-fluid within said sealing-fluid supply system;
   a second chamber substantially fluidly isolated from said first chamber and in fluid communication with fuel within said fuel supply system; and
   a control member that is moveable in response to changes in the pressure within at least one of said first and second chambers, wherein the sealing-fluid pressure within said fluid seal is dynamically controllable in coordination with movements of said control member.

2. The fluid seal apparatus of claim 1 wherein said pressure-balancing device is operable to reduce the differential fluid pressure between the sealing-fluid pressure within said fluid seal and the fuel pressure within said fuel chamber.

3. The fluid seal apparatus of claim 1 wherein said control member is moveable to adjust the sealing-fluid pressure within said fluid seal in response to changes in fuel pressure within said second chamber.

4. The fluid seal apparatus of claim 1 wherein said control member is moveable to adjust the fuel pressure within said fuel chamber in response to changes in sealing-fluid pressure within said first chamber.

5. The fluid seal apparatus of claim 1 wherein said fuel supply system further comprises a controllable fuel pressure regulator for regulating the fuel pressure within said fuel chamber in response to changes in engine load.

6. The fluid seal apparatus of claim 1 wherein said fuel is a gaseous fuel.

7. The fluid seal apparatus of claim 6 wherein said gaseous fuel is selected from the group consisting of natural gas, hydrogen, and liquefied petroleum gas.

8. The fluid seal apparatus of claim 1 wherein said mechanical device is a fuel injection valve for an internal combustion engine.

9. The fluid seal apparatus of claim 8 wherein said moveable component is a valve needle that is moveable between a closed position and an open position for injecting fuel from said fuel chamber through at least one nozzle orifice into a combustion chamber of said engine.

10. The fluid seal apparatus of claim 8 wherein said pressure-balancing device is external to said fuel injection valve.

11. The fluid seal apparatus of claim 1 wherein said pressure-balancing device comprises a cylinder and said control member comprises a piston moveable within said cylinder, wherein said piston separates said first chamber from said second chamber.

12. The fluid seal apparatus of claim 11 wherein said pressure-balancing device is biased so that said piston is in equilibrium when sealing-fluid pressure within said first chamber is a predetermined amount higher than fuel pressure within said second chamber.

13. The fluid seal apparatus of claim 12 wherein a spring is employed to bias said pressure-balancing device.

14. The fluid seal apparatus of claim 12 wherein said pressure-balancing device is biased by said piston having a first effective surface area facing said first chamber that is smaller than a second effective surface area facing said second chamber.

15. The fluid seal apparatus of claim 11 further comprising a sensor for detecting movement or the position of said piston within said cylinder and emitting a signal representative of said piston movement or position to a sealing-fluid control unit, which controls the delivery of sealing-fluid to said first chamber in response to said signal.

16. The fluid seal apparatus of claim 15 wherein said pressure-balancing device further comprises a piston rod associated with said piston and extending through said first chamber and outside said cylinder.

17. The fluid seal apparatus of claim 16 wherein said sensor is a position sensor that detects the position of said piston rod to determine the position of said piston.

18. The fluid seal apparatus of claim 15 wherein said sealing-fluid control unit controls a sealing-fluid pump that is controllable to control sealing-fluid pressure within said first chamber.

19. The fluid seal apparatus of claim 18 further comprising a pulsation damper downstream of said pump and upstream of said pressure-balancing device.

20. The fluid seal apparatus of claim 1 wherein said sealing-fluid is a liquid.

21. The fluid seal apparatus of claim 20 wherein said sealing-fluid is diesel fuel.

22. The fluid seal apparatus of claim 1 wherein said pressure-balancing device comprises a fluid regulator valve that comprises a fluid passage that is openable to control the flow of sealing-fluid through said fluid passage and to said fluid seal, wherein said fluid passage comprises said first chamber, said second chamber is a control chamber that is fluidly connected to said fuel supply system, and said control member is moveable in response to changes in fuel pressure within said control chamber.

23. The fluid seal apparatus of claim 22 wherein said control member comprises a diaphragm and said fluid regulator valve is a diaphragm-operated pressure control valve, wherein said diaphragm is deformable in response to changes in fuel pressure within said control chamber.

24. The fluid seal apparatus of claim 22 wherein said control chamber is a cylinder and said control member comprises a piston that is moveable within said cylinder.

25. The fluid seal apparatus of claim 22 wherein said fluid regulator valve is operable to control the sealing-fluid pressure downstream of said fluid regulator valve to be equal to or greater than the fuel pressure within said second chamber, said apparatus further comprising:
   (c) a sensor for detecting sealing-fluid pressure at a location within said sealing-fluid supply system downstream of a sealing-fluid pump and emitting a signal that is representative of said sealing-fluid pressure; and
   (d) a sealing-fluid flow control unit in communication with said sensor for receiving said signal, said control unit controlling said sealing-fluid pump in response to said signal to maintain the sealing-fluid pressure at said sensor location at a pressure that is higher than the fuel pressure within said fuel chamber.

26. The fluid seal apparatus of claim 25 wherein said sensor is upstream of said fluid regulator valve.

27. The fluid seal apparatus of claim 25 wherein said sensor comprises a pressure transducer.

28. The fluid seal apparatus of claim 25 further comprising a pulsation damper downstream of said pump and upstream of said fluid regulator valve.

29. The fluid seal apparatus of claim 22 wherein said fluid regulator valve is operable to control the re-circulation of sealing-fluid within said sealing-fluid supply system to control the sealing-fluid pressure upstream of said fluid regulator valve to be equal to or greater than fuel pressure within said second chamber.

30. The apparatus of claim 29 further comprising a sensor for detecting sealing-fluid pressure at a location within said sealing-fluid supply system between a sealing-fluid pump and said fluid regulator valve.

31. The fluid seal apparatus of claim 1 wherein said pressure-balancing device comprises a fluid regulator valve that is operable to control the flow of fuel flowing to said fuel chamber so that pressure within said fuel chamber is less than or equal to pressure within said fluid seal, wherein said first chamber is a control chamber that is fluidly connected to said sealing-fluid supply system, said second chamber is provided within a fluid passage within said fluid regulator valve, which is openable to control the flow of fuel through said fluid passage, and said control member is moveable in response to changes in the sealing-fluid pressure within said control chamber.

32. The fluid seal apparatus of claim 31 wherein said control member comprises a diaphragm and said fluid regulator valve is a diaphragm-operated pressure control valve, wherein said diaphragm is deformable in response to changes in the sealing-fluid pressure within said control chamber.

33. The fluid seal apparatus of claim 31 wherein said control chamber is a cylinder and said control member comprises a piston that is moveable within said cylinder.

34. The fluid seal apparatus of claim 31 further comprising:
   (c) a sensor for detecting sealing-fluid pressure at a location within said sealing-fluid supply system downstream of a sealing-fluid pump and emitting a signal that is representative of sealing-fluid pressure at said sensor location; and
   (d) a sealing-fluid flow control unit in communication with said sensor for receiving said signal and data relating to engine operating conditions, said control unit calibrated to control a sealing-fluid pump in response to said signal and said engine operating condition data to provide sealing-fluid pressure within said fluid seal that is predetermined by said engine operating conditions.

35. The fluid seal apparatus of claim 34 wherein said sealing-fluid supply system comprises a re-circulation loop and a flow control valve that is controllable to control sealing-fluid pressure within said fluid seal by controlling the amount of sealing-fluid that is re-circulated within said sealing-fluid supply system.

36. The fluid seal apparatus of claim 34 wherein said sensor is upstream of said fluid regulator valve.

37. The fluid seal apparatus of claim 36 wherein said sensor comprises a pressure transducer.

38. The fluid seal apparatus of claim 36 further comprising a pulsation damper downstream of said pump and upstream of said fluid regulator valve.

39. The fluid seal apparatus of claim 1 further comprising a pressure-relief loop comprising a fluid passage for recycling sealing-fluid within said sealing-fluid supply system when sealing-fluid pressure within said fluid seal is greater than a predetermined value.

40. The fluid seal apparatus of claim 39 wherein said pressure-relief loop further comprises a pressure-relief valve for automatically controlling the amount of sealing-fluid that is recycled.

41. A method for dynamically controlling sealing-fluid pressure within a fluid seal that provides sealing to a fuel chamber within an injection valve for an internal combustion engine, said injection valve comprising a moveable component penetrating through an opening in a wall of said fuel chamber, said fluid seal providing sealing by being disposed within said opening to prevent fuel from leaking through a clearance gap between said moveable component and said opening, said method comprising dynamically controlling sealing-fluid pressure within said fluid seal so that it is equal to or higher than fuel pressure within said fuel chamber by balancing the sealing-fluid pressure upstream of said fluid seal with the fuel pressure upstream of said fuel chamber.

42. The method of claim 41 wherein fuel pressure within said fuel chamber is controlled to change in response to changes in engine load conditions.

43. The method of claim 41 further comprising controlling the sealing-fluid pressure in response to the instant engine load condition whereby said method further comprises:
   (c) controlling sealing-fluid pressure within said fluid seal so that it is greater than fuel pressure within said fuel chamber when said engine is under load; and
   (d) controlling sealing-fluid pressure within said fluid seal so that it is substantially equal with fuel pressure within said fuel chamber when said engine is not under load.

44. The method of claim 41 wherein balancing the respective sealing-fluid and fuel pressures is accomplished by maintaining a piston in an equilibrium position within a cylinder.

45. The method of claim 41 wherein balancing the respective sealing-fluid and fuel pressures is accomplished by controlling the flow of sealing-fluid directed to said fluid seal in response to changes in fuel pressure within a control chamber of a fluid regulator valve that regulates the flow of sealing-fluid to said fluid seal.

46. The method of claim 41 wherein balancing the respective sealing-fluid and fuel pressures is accomplished by controlling the flow of fuel directed to said fuel chamber in response to changes in sealing-fluid pressure within a control chamber of a fluid regulator valve that regulates the flow of fuel to said fuel chamber.

47. The method of claim 41 wherein an apparatus for balancing the respective sealing-fluid and fuel pressures comprises a pressure-balancing device, and said method further comprises measuring sealing-fluid pressure upstream of said pressure-balancing device and controlling a sealing-fluid pump upstream of said pressure-balancing device to maintain a sealing-fluid pressure upstream of said pressure-balancing device that is higher than the fuel pressure within said fuel chamber.

48. The method of claim 47, further comprising reducing sealing-fluid pressure pulses downstream of said pump by directing sealing-fluid through a pulsation damper.

* * * * *